April 26, 1960   W. A. ERNEST   2,934,037
AUTOMATIC FEEDER
Filed Sept. 26, 1958   2 Sheets-Sheet 1
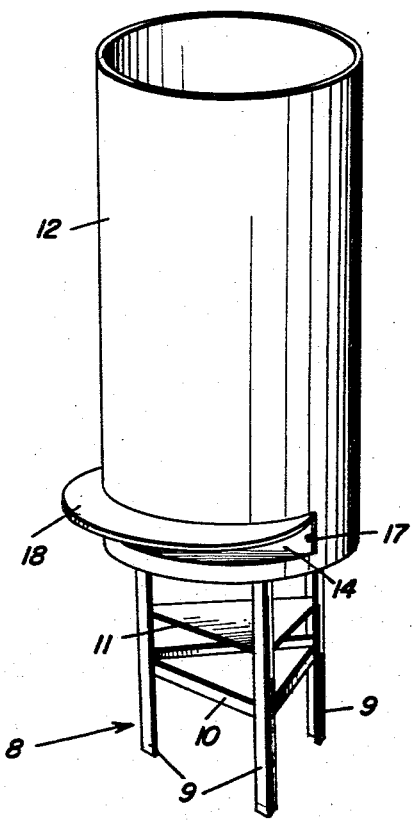
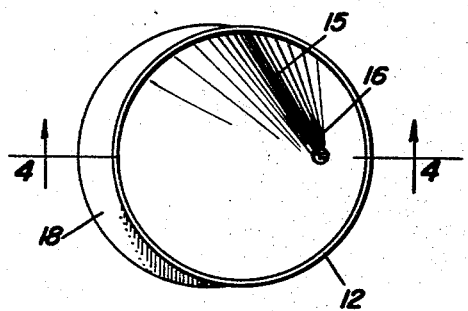
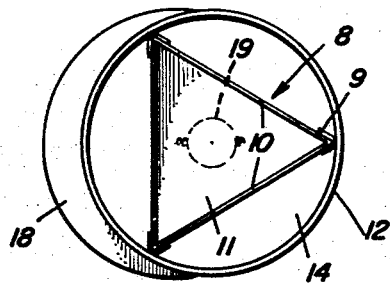
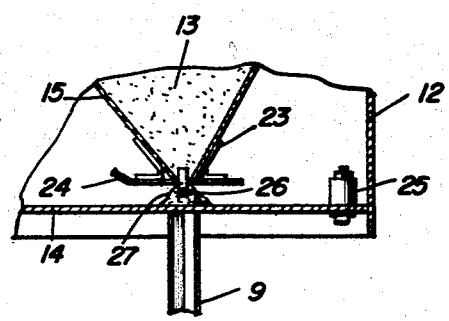
William A. Ernest
INVENTOR.

April 26, 1960
W. A. ERNEST
2,934,037
AUTOMATIC FEEDER
Filed Sept. 26, 1958
2 Sheets-Sheet 2
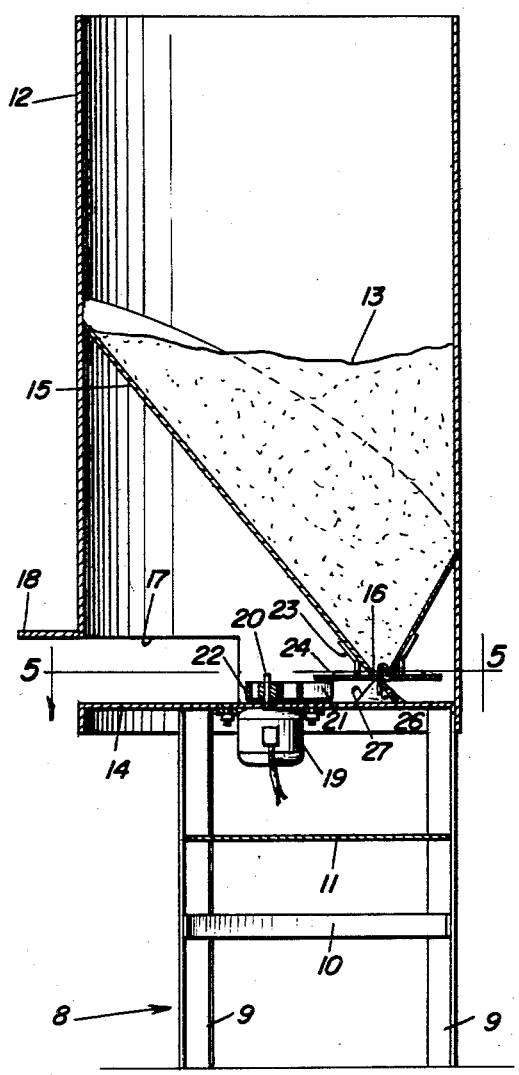
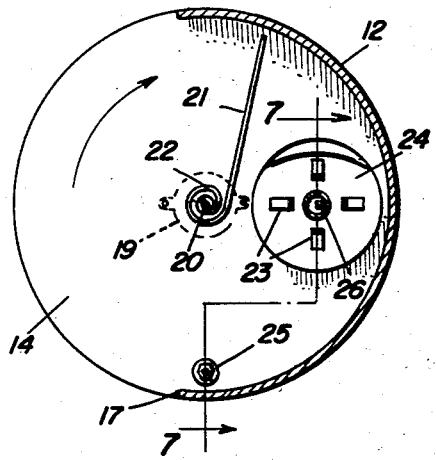
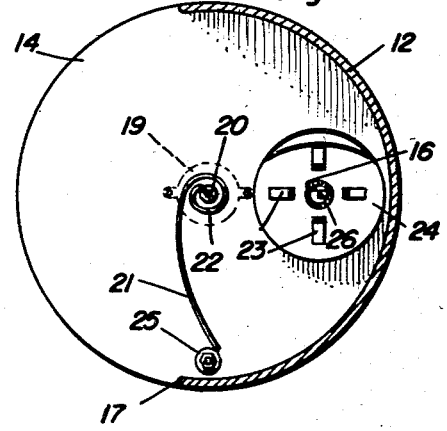
William A. Ernest
INVENTOR.

2,934,037
AUTOMATIC FEEDER

William A. Ernest, Albuquerque, N. Mex.

Application September 26, 1958, Serial No. 763,558

1 Claim. (Cl. 119—56)

This invention relates to new and useful improvements in feeders for fish, birds and animals, particularly the former, and has for one of its important objects to provide, in a manner as hereinafter set forth, novel motor actuated means for automatically discharging a quantity of feed at spaced time intervals.

Another important object of the present invention is to provide, in an automatic fish, etc., feeder of the aforementioned character comprising a container including a hopper having a gravity discharge, unique means for ejecting and scattering the feed as it flows from said hopper.

Other objects of the invention are to provide an automatic fish, bird or animal feeder of the character set forth which will be comparatively simple in construction, strong, durable, compact, of light weight and which may be manufactured at low cost.

All of the foregoing and still further objects and advantages of the invention will become apparent from a study of the following specification, taken in connection with the accompanying drawing wherein like characters of reference designate corresponding parts throughout the several views, and wherein:

Figure 1 is a perspective view of an automatic feeder constructed in accordance with the present invention;

Figure 2 is a top plan view thereof;

Figure 3 is a bottom plan view of the device;

Figure 4 is an enlarged vertical sectional view through the device, taken substantially on the line 4—4 of Figure 2;

Figure 5 is a horizontal sectional view, taken substantially on the line 5—5 of Figure 4;

Figure 6 is a view in horizontal section substantially similar to Figure 5 but showing the ejector about to be released; and Figure 7 is a fragmentary view in vertical section through the lower portion of the device, taken substantially on the line 7—7 of Figure 5.

Referring now to the drawing in detail, it will be seen that the embodiment of the invention which has been illustrated comprises a metallic stand which is designated generally by reference character 8. The stand 8 includes a plurality of angle iron legs 9 between which braces 10 extend. Affixed to the legs 9 above the braces 10 is a triangular plate 11. Removably mounted on the stand 8 is a cylindrical container 12 of suitable metal. The container 12, which may also be of any desired dimensions or capacity, is for the reception of the feed, as indicated at 13. The container 12 includes a raised bottom 14 beneath which the legs 9 of the stand 8 are engageable. Mounted in the container 12 is a generally conical hopper 15 comprising a rearwardly off-center discharge opening 16 spaced from the bottom 14 of said container. Immediately adjacent the bottom 14 the lower, front portion of the container 12 is provided with a circumferentially elongated outlet 17 for the feed 13. A substantially crescent-shaped weather excluding visor 18 is provided on the container 12 above the outlet 17.

Mounted centrally beneath the bottom 14 of the container 12 is a suitable electric motor 19. The motor 19 comprises a split shaft 20 which extends upwardly through an opening provided therefor in the container bottom 14. Mounted on the motor shaft 20 and operable on the bottom 14 of the container 12 is a resilient ejector 21 in the form of a spring arm comprising a coiled inner end portion 22 which is affixed to said shaft. The ejector 21 is adapted to swing beneath the outlet 16 of the hopper 15 for sweeping from therebeneath the feed which flows therefrom and accumulates on the bottom 14 of the container 12. Suspended by hangers or brackets 23 from the lower portion of the hopper 15 is an apertured, circular plate 24 providing a guide for the ejector 21. Mounted on the bottom 14 of the container 12, adjacent one end of the outlet 17, is a stop or abutment 25 in the form of a roller for the ejector 21. The abutment 25 is located in the path of the free end portion of the ejector 21. Mounted in the lower portion of the hopper 15 and extending downwardly therefrom through the discharge opening 16 for engagement and actuation by the ejector 21 is a resilient agitator 26 to prevent the feed 13 from clogging.

It is thought that the operation of the device will be readily apparent from a consideration of the foregoing. Briefly, the electric motor 19 is to be controlled by a suitable timer. The feed 13 flows by gravity through the discharge opening 16 of the hopper 15 and accumulates on the bottom 14 of the container 12, as indicated at 27. When the motor 19 is energized the ejector 21, travelling in a clockwise direction as indicated by the arrow in Figure 5 of the drawing, passes beneath the guide 24 and sweeps the accumulated feed 27 around the bottom 14 of the container 12 toward the outlet 17. When the free end portion of the resilient ejector 21 engages the abutment 25, said ejector is momentarily arrested thereby, flexed or bent and tensioned. As the motor shaft 20 continues to rotate the ejector 21 is caused to clear the abutment 25 in an obvious manner and the feed in front of said ejector is kicked or snapped through the outlet 17 and scatttered. By the time the ejector 21 makes a complete circle there is a new accumulation of feed at 27. As hereinbefore stated, the ejector 21 also engages and actuates the agitator 26 for insuring the free discharge of the feed from the hopper 15. The stand 8 is of a shape and dimensions to fit in the container 12 for compactness when shipping or storing the device.

It is believed that the many advantages of an automatic feeder constructed in accordance with the present invention will be readily understood and although a preferred embodiment of the device is as illustrated and described, it is to be understood that changes in the details of construction and in the combination and arrangement of parts may be resorted to which will fall within the scope of the invention as claimed.

What is claimed as new is as follows:

A feeder comprising a support, a cylindrical container, for the reception of feed, mounted on said support and including a bottom, said container having a circumferentially elongated discharge opening therein immediately adjacent said bottom, a hopper in the container spaced from the bottom and having an off-center outlet located to deposit the feed on the bottom at a point diametrically opposite the discharge opening, a centrally located, vertical shaft rotatably mounted on the bottom, a resilient arm mounted on said shaft and operable on the bottom for sweeping the feed from the hopper toward the opening, a feed agitator in the hopper depending therefrom through the outlet thereof into the path of the arm for periodic engagement and actuation thereby for depositing the feed therebehind on the bottom, a circular, apertured, horizontal guide plate for the arm suspended from the hopper in spaced relation to the bottom and cooperable there-with for confining said arm therebetween during its travel beneath said hopper, and an abutment on the bottom between the hopper outlet and the discharge opening and in the path of the arm for engagement thereby for momentarily arresting, tensioning and then releasing said arm for scattering the feed into the atmosphere through said discharge opening.

References Cited in the file of this patent

UNITED STATES PATENTS

| | | |
|---|---|---|
| 829,204 | Hackburn et al. | Aug. 21, 1906 |
| 2,583,767 | Daignas | Jan. 29, 1952 |
| 2,841,401 | Mascaro | July 1, 1958 |